(12) United States Patent
Iizuka et al.

(10) Patent No.: US 10,252,481 B2
(45) Date of Patent: Apr. 9, 2019

(54) METHOD FOR FORMING GOLF BALL AND MOLD THEREFOR

(71) Applicant: BRIDGESTONE SPORTS CO., LTD., Tokyo (JP)

(72) Inventors: Kae Iizuka, Chichibu (JP); Atsushi Komatsu, Chichibu (JP); Masataka Kai, Chichibu (JP); Katsunori Sato, Chichibu (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 0 days.

(21) Appl. No.: 15/655,158

(22) Filed: Jul. 20, 2017

(65) Prior Publication Data
US 2017/0313009 A1    Nov. 2, 2017

Related U.S. Application Data

(62) Division of application No. 13/917,176, filed on Jun. 13, 2013, now Pat. No. 9,744,735.

(51) Int. Cl.
*A63B 37/00* (2006.01)
*B29C 45/14* (2006.01)
*B29D 99/00* (2010.01)
*B29L 31/54* (2006.01)

(52) U.S. Cl.
CPC .... *B29D 99/0042* (2013.01); *B29C 45/14073* (2013.01); *A63B 37/004* (2013.01); *A63B 37/0029* (2013.01); *B29L 2031/546* (2013.01)

(58) Field of Classification Search
CPC ............ A63B 37/0005; A63B 37/0033; A63B 37/0045; B29C 45/14073; B29C 2045/14147; B29C 2045/14122; B29C 45/1635; B29C 2045/366; B29L 2031/546
See application file for complete search history.

(56) References Cited

U.S. PATENT DOCUMENTS

| 6,033,611 A | 3/2000 | Yamaguchi |
| 2004/0222555 A1 | 11/2004 | Puniello et al. |
| 2005/0098921 A1 | 5/2005 | Endo et al. |

FOREIGN PATENT DOCUMENTS

| JP | 10258141 A | 9/1998 |
| JP | 3319708 B2 | 3/1999 |
| JP | 3663580 B2 | 5/2001 |
| JP | 4019242 B2 | 11/2001 |
| JP | 2005143610 A | 6/2005 |

OTHER PUBLICATIONS

Notification of Reasons for Refusal dated Feb. 15, 2018 from the Japanese Patent Office in counterpart Japanese application No. 2014-081129.

*Primary Examiner* — Stella K Yi
(74) *Attorney, Agent, or Firm* — Sughrue Mion, PLLC

(57) ABSTRACT

A method for forming a golf ball provides a core member comprising a core of a golf ball into a cavity of a mold so that the core member is supported by a movable holding pin disposed in the mold; forming a layer outside the core member by injecting a material of the layer into the cavity; and retracting the pin from the cavity into the mold during the material injection so that a portion projecting from a surface of the layer is formed by a tip of the pin, the projecting portion having a site area of at least 0.2% in relation to an entire area of the tip of the pin and having a height of at least 0.2 mm. This method can be implemented by controlling the retraction of the pin, or alternatively by using the pin having a predetermined indentation portion on the tip.

5 Claims, 3 Drawing Sheets

METHOD FOR FORMING GOLF BALL AND MOLD THEREFOR

CROSS REFERENCE TO RELATED APPLICATIONS

This application is a divisional of U.S. application Ser. No. 13/917,176, filed Jun. 13, 2013, the contents of which is incorporated herein by reference in its entirety.

BACKGROUND OF THE INVENTION

The present invention relates to a method for forming a golf ball and relates to a mold used therefor.

As a method for producing a golf ball, Japanese Patent No. 3319708 discloses a method, as a conventional technique, in which in providing a layer, an inner core located more to the inside of the ball than the layer, is separately molded by vulcanization, then the inner core is fixed at a predetermined location within a mold by means of a movable holding pin, then a material for forming an outer layer is injection-molded by using an injection molding machine or a transfer mold, and the holding pin is withdrawn at an appropriate timing, and vulcanization molding is performed in this state. In order to avoid increase in cost due to complicated processes and mold structure required in such a molding method that uses a pin, Japanese Patent No. 3319708 discloses a method for forming a golf ball having an outer layer and an inner layer which does not use a holding pin, in which an unvulcanized material is semi-vulcanized to form a hemispherical shell-like outer layer half split bodies and then an unvulcanized material for forming the inner layer is sandwiched between a pair of the above-described semi-vulcanized outer layer half split bodies to press-mold the same by vulcanization.

In addition, Japanese Patent No. 3663580 discusses a method for producing a golf ball, in which an unvulcanized material is semi-vulcanized or vulcanized to form hemispherical shell-like outer layer half split bodies, and then an unvulcanized material for forming an inner layer is sandwiched between a pair of the above-described outer layer half split bodies to form a golf ball including the outer layer and the inner layer, and the inner layer forming material is poured between the outer layer half split bodies to at the same time form an invaded portion formed by the inner layer passing through or engaged in at least a part of a seam portion of the outer layer, in which the volume of the passing or engaged invaded portion is 1/300 to 1/5 of a volume considered to be obtained if it is assumed that the outer layer has the shape of a complete spherical shell.

Japanese Patent No. 4019242 discusses a method for producing a multilayered golf ball having a core covered with at least outermost layer covers and an intermediate layer cover sandwiched therebetween, in which a top/bottom split mold is used, a core or a sphere covered with the intermediate cover is provided inside the mold, a cover material is injection-molded around the core or the sphere, the cover material is molded so that the molded body has a spherical shape and a thickness of 1.1 mm or more, and then the surface of the sphere-like molded body is cut and processed to leave a cutting margin of 0.3 to 2 mm to obtain a sphere of which the product thickness of the above-described intermediate layer cover or the outermost layer cover is 1 mm or less.

SUMMARY OF THE INVENTION

A movable holding pin included in a mold for a golf ball has roles of preventing decentering of a core and assisting in removing a molded product from the mold after the molding is completed. With the above-described roles, it is required for a movable holding pin to contact the core member until the molding is completed. Because the temperature of a material for an inner layer or an outer layer to be poured into the mold is high while the temperature of the holding pin itself is low, an interface may be generated in the product to be formed by molding. This is the factor responsible for a large skin layer generated particularly around the surface layer. In particular, a skin layer existing on the surface layer is the factor responsible for degraded durability of the golf ball.

The present invention has been made in view of the above-described problems, and the object of the present invention is to provide a method for forming a golf ball and a mold used therefor capable of improving the durability of a golf ball by suppressing a skin layer which may be generated on a surface layer of a molded product.

In order to achieve the above-described object, according to an aspect of the present invention, a method for forming a golf ball, includes: providing a core member comprising a core of a golf ball into a cavity of a mold so that the core member is supported by a movable holding pin disposed in the mold; forming a layer on an outer periphery of the core member by injecting a material of the layer into the cavity of the mold; and retracting the holding pin from the cavity into the mold during the injection of the material so that a portion projecting from a surface of the layer is formed by a tip of the holding pin, the projecting portion having a site area of at least about 0.2% in relation to an entire area of the tip of the holding pin and having a height of at least about 0.2 mm.

The projecting portion may have a site area of at least about 1.0% in relation to the entire area of the tip of the holding pin and may have a height of at least about 0.3 mm. The projecting portion may be formed for the entire area of the tip of the holding pin. The number of the projecting portions may be in a range of 2 to 20 for forming one golf ball.

The method of the present invention may further include removing the projecting portion. The layer may be formed by either an injection molding method or a cast molding method.

The material may be a polymeric material with a melt viscosity of at least 1.0 Pa·s at 230° C. measured by a Capirograph.

According to another aspect of the present invention, a mold for a golf ball includes: at least two mold bodies, in which a cavity for molding the golf ball is formed by joining the bodies together; and a movable holding pin disposed in at least one of the mold bodies, the holding pin comprising an indentation portion at a tip thereof, the indentation portion being arranged in an area of at least about 0.2% in relation to an entire area of an imaginary top surface of the tip of the holding pin on which the indentation portion is assumed to be absent and having a depth of at least about 0.2 mm.

The indentation portion may be arranged in an area of at least about 1.0% in relation to the entire area of the imaginary top surface of the tip of the holding pin and has a depth of at least about 0.3 mm. The number of the holding pins may be in a range of 2 to 20 for the whole mold.

DESCRIPTION OF THE EMBODIMENTS

Hereinbelow, embodiments of the method for forming a golf ball and a mold used therefor according to the present invention will be described in detail with reference to the attached drawings. Note that the drawings are not necessarily drawn to scale in order to facilitate understanding of the present invention.

Figure 1:
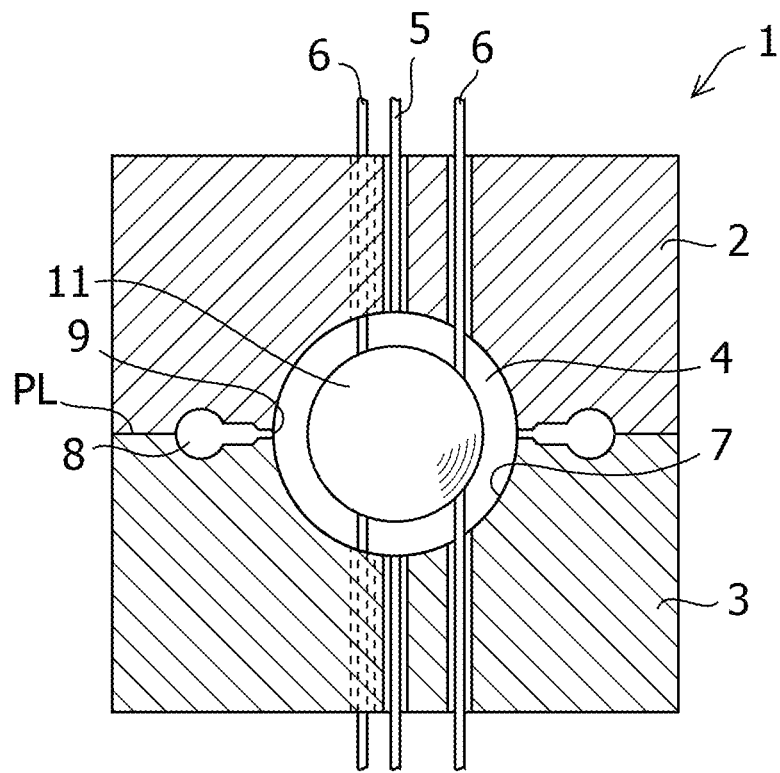
FIG. 1 is a cross section illustrating an example of a mold used for the method for forming a golf ball according to the present invention.

Referring to FIG. 1, a mold 1 is used for producing a golf ball by an injection molding method. In the following description, a case in which an outer layer (cover) of a golf ball including a plurality of layers is formed on an outer periphery of a core will be described. However, the present invention is not limited to this. More specifically, the present invention can be applied to a case in which an inner layer (intermediate layer) of the golf ball including a plurality of layers and to a case in which a single layer of a golf ball including the single layer is formed on an outer periphery of a core.

The mold 1 includes a metal top mold 2 and a bottom mold 3. By detachably joining the top mold 2 and the bottom mold 3 together, a spherical cavity 4 is formed inside the mold 1. A large number of protrusions (not illustrated) for embossing a surface of a golf ball (i.e., the surface of a cover) with dimples are arranged on a cavity wall surface 7 of the mold 1. A parting line PL between the top mold 2 and the bottom mold 3 is located at a position corresponding to the equator of the cavity.

The mold 1 includes gas ventilation pins 5 and movable holding pins 6, which respectively extend in a direction orthogonal to the parting line PL. The gas ventilation pins 5 are located at the north pole and the south pole points of the cavity 4 and function to degas the cavity 4. The gas ventilation pins 5 are respectively held in a holding hole corresponding thereto.

The holding pins 6 are provided so as to oscillate back and forth in a corresponding holding hole and hold a core member 11 in the center of the cavity 4 when the holding pins 6 are allowed to enter the cavity 4. The holding pins 6 can be provided by the number required for supporting the core member 11 so that the core member 11 is stabilized. The number of the holding pins 6 is preferably about 2 or more, more preferably about 4 or more, and yet more preferably about 6 or more. The number of the holding pins 6 is not limited to a specific upper limit and is preferably about 20 or less, more preferably about 16 or less, and yet more preferably about 10 or less. Herein, the core member 11 includes a core and an inner layer formed on the outer periphery of the core.

The holding pins 6 usually have a circular cross section. The diameter of the holding pins 6 is not limited to a specific lower limit and is preferably about 2.5 mm or more and more preferably about 2.8 mm or more. The diameter of the holding pins 6 is not limited to a specific upper limit and is preferably about 20 mm or less and more preferably about 15 mm or less.

Figure 2:
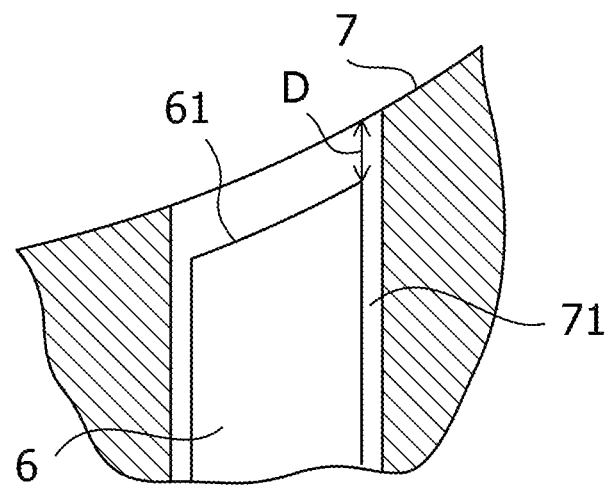
FIG. 2 is an enlarged cross section illustrating a holding pin and a tip portion of a corresponding holding hole in the mold illustrated in FIG. 1, which illustrates an embodiment of the method for forming a golf ball according to the present invention.

Referring to FIG. 2, it is preferable to minimize the clearance between the holding pin 6 itself and a corresponding holding hole 71. The clearance is not limited to a specific upper limit and is preferably about 30 μm or less, and more preferably about 20 μm or less. The clearance is not limited to a specific lower limit and is preferably about 5 μm or more, and more preferably about 10 μm.

In addition, the mold 1 is provided with a ring-like runner 8, which surrounds the cavity 4 on the parting line PL. On the side of the inner periphery of the ring-like runner 8, a plurality of molding material injection gates 9, which opens toward the inside of the cavity 4, is provided along the circumferential direction at regular intervals.

In the above-described configuration, the core member 11 is placed inside the cavity 4 of the mold 1 first and arranged so that the core member 11 is located in the center of the golf ball by means of the movable holding pins 6. Next, a material of the outer layer to be formed on the outer periphery of the core member 11 is supplied to the inside of the cavity 4 by injection through the molding material injection gates 9. As the outer layer is molded, air existing inside the cavity 4 and volatile components, such as gas mixed in the supplied material and emitted therefrom, are discharged to the outside of the mold 1 through a clearance between the respective gas ventilation pins 5 and the corresponding holding hole. Furthermore, the air and the volatile components are discharged to the outside of the mold 1 also through the clearance between the holding pins 6 and the respectively corresponding holding hole 71.

Immediately before the injection of the material of the outer layer is completed, the holding pins 6 supporting the core member 11 are drawn back into the holding holes 71 and the injection molding ends. In this process, as illustrated in FIG. 2, the holding pin 6 is controlled so that a tip end face 61 thereof is retracted from the cavity wall surface 7 to a location retracted therefrom by an amount equivalent to a depth D. When the contact portion 61 of the holding pin 6 is retracted from the cavity wall surface 7 to a location of retraction by the above-described depth, a surface of the outer layer is formed by the cavity wall surface 7 and a portion projecting from the outer layer surface is formed by a space between the cavity wall surface 7 and the tip end face 61 of the pin.

Because the temperature of the holding pin 6 is low compared with that of the material supplied by injection, an interface is generated on a molded product of the material in contact with the holding pin 6. In particular, a skin layer, which is the cause of degraded durability of the golf ball, is generated on the surface of the molded product. In the present invention, the space between the cavity wall surface 7 and the tip end face 61 of the pin is formed in the above-described manner and the projecting portion of the molded product is intentionally formed by the space. Because the skin layer, which is the cause of the above-described problem, is included in the projecting portion, the skin layer included in the projecting portion can be removed together with the projecting portion by processes of polishing and cutting the outer layer surface to be performed later. Accordingly, the skin layer formed on the surface of the outer layer of the golf ball can be reduced or removed. Therefore, the durability of the golf ball can be improved.

The projecting portion formed on the outer layer in the above-described manner has a height of at least 0.2 mm. If the height of the projecting portion is less than 0.2 mm, the quantity of skin layers formed on the outer layer surface and remaining on the surface of the ball becomes large. In this case, a sufficient durability cannot be achieved. The height of the projecting portion of the outer layer can be controlled by adjusting the position of stopping the tip end face 61 of the holding pin 6. The tip end face 61 of the pin is stopped at a position of retraction from the cavity wall surface 7, which is indicated by the depth D. In this manner, the projecting portion having the height equivalent to the depth D can be formed.

The lower limit of the height of the projecting portion of the outer layer to be formed is preferably about 0.3 mm or more, more preferably about 0.5 mm or more, and even more preferably about 5 mm or more. On the other hand, the upper limit of the height of the projecting portion is preferably about 10 mm or less. If the height exceeds the upper limit of about 10 mm, the projecting portion cannot be easily polished off or removed because its height is too great. In addition, in this case, there may be a risk such that the molded product cannot be easily removed from the mold 1 after the outer layer is molded. The upper limit of the height of the projecting portion is more preferably about 7 mm or less.

In the embodiment described above, a case is described in which the holding pin 6 is flush with the cavity wall surface 7 on the tip end face 61 thereof. However, the present invention is not limited to this. For example, the present invention can be implemented by a mold including a protruded portion on the tip of the holding pin 6 as illustrated in FIGS. 3 and 4.

According to this embodiment, the tip of the holding pin 6 includes a contact portion 63, which is located in the center portion and directly contacts the core member 11, and an indentation portion 62, which is located around the contact portion 63. The surface of the contact portion 63 has a shape by which it becomes flush with the cavity wall surface 7. The indentation portion 62 has a depth $D_1$, which is a depth from an imaginary top surface 64 of the tip of the pin on which the indentation portion 62 is assumed to be absent, to the surface of the indentation portion 62 along the axis of the pin. The lower limit of the depth $D_1$ of the indentation portion 62 is at least 0.2 mm. If the depth $D_1$ of the indentation portion 62 is less than 0.2 mm, a projecting portion of the outer layer formed by the space between the surface of the indentation portion 62 and the cavity wall surface 7 becomes small. Therefore, a large quantity of skin layers may remain on the surface of the outer layer. As a result, a sufficient durability cannot be achieved. The lower limit of the depth $D_1$ of the indentation portion 62 is preferably about 0.3 mm or more, more preferably about 0.5 mm or more, and even more preferably about 5 mm or more. The upper limit of the depth $D_1$ of the indentation portion 62 is preferably about 10 mm or less and more preferably 7 mm or less.

The indentation portion 62 is arranged so that the area of the surface of the contact portion 63 of the holding pin 6 is decreased to be smaller, by about at least 0.2%, than the entire area of the imaginary top surface of the tip of the holding pin 6 on which the indentation portion 62 is assumed to be absent. The indentation portion 62 is configured as described above because if the decrease ratio for the area of the tip of the pin is less than about 0.2%, there may be a risk such that the projecting portion of the outer layer formed by the space between the surface of the indentation portion 62 and the cavity wall surface 7 may not be evenly formed, and because it becomes difficult to process the tip of the holding pin 6 in this case. The lower limit of the area decrease ratio of the tip of the pin is preferably about 0.3% or more and more preferably about 1.0% or more. The upper limit of the area decrease ratio of the tip of the pin is preferably about 90% or less and more preferably about 80% or less considering the ease of processing the tip of the pin although it is not particularly limited in terms of forming of the projecting portion as the embodiment illustrated in FIG. 2.

Figure 3:
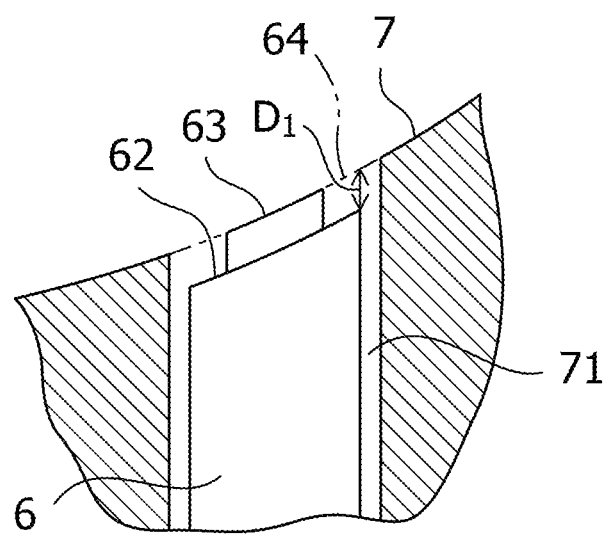
FIG. 3 is an enlarged cross section illustrating a holding pin and a tip portion of a corresponding holding hole in a mold for a golf ball, which illustrates an embodiment of the mold according to the present invention.
Figure 4:
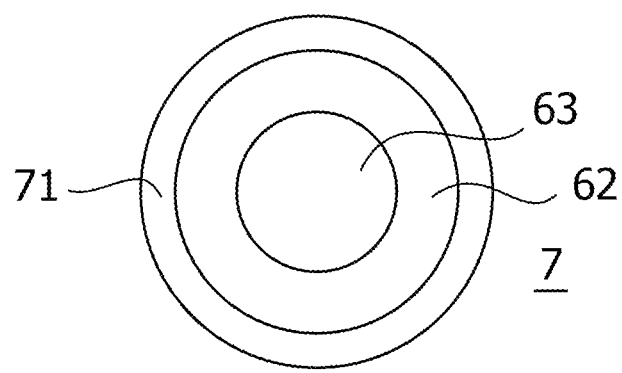
FIG. 4 is an enlarged plan view illustrating a tip of the holding pin illustrated in FIG. 3.

The holding pin 6, which includes the indentation portion 62 and the contact portion 63 described above, is controlled so that the surface of the contact portion 63 retracts to the location which is level with the cavity wall surface 7 immediately before the injection of the material of the outer layer is completed, as illustrated in FIG. 3. With this control, the surface of the contact portion 63 molds the surface of the outer layer of the golf ball similarly to the cavity wall surface 7 and a projecting portion projecting from the surface of the outer layer is formed by the space between the cavity wall surface 7 and the surface of the indentation portion 62. The skin layer, which is the cause of degrading the durability, is included in the projecting portion. The projecting portion including the skin layer is removed by subsequent processes for polishing the surface of the outer layer or other processes.

The projecting portion of the outer layer formed by the present embodiment has the height equivalent to the depth $D_1$ of the indentation portion 62. More specifically, the projecting portion, which has the height of about 0.2 mm or more, preferably about 0.3 mm or more, more preferably about 0.5 mm or more, and yet more preferably about 5 mm or more, is formed. In addition, the projecting portion is formed with a ring-like shape on the outer periphery of the contact portion 63 located in the center of the pin. The projecting portion is formed so as to have a site area similar to an area of the bottom surface of the indentation portion 62. More specifically, the projecting portion preferably has a site area of about 0.2% or more, preferably about 0.3% or more, more preferably about 1.0% or more in relation to the entire area of the imaginary top surface of the tip of the holding pin 6 on which the indentation portion 62 is assumed to be absent.

In FIG. 3, the surface of the indentation portion 62 of the holding pin 6 has a sloped shape so that it becomes similar to the shape of the cavity wall surface 7. However, the shape of the surface of the indentation portion 62 is not limited to this. More specifically, the surface of the indentation portion 62 can have a shape that allows a projecting portion having a predetermined height to be formed. For example, alternatively, the surface of the indentation portion 62 can have a horizontal shape that is parallel to the parting line PL.

Figure 5A:
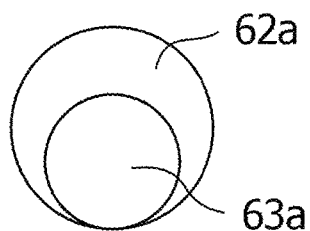
FIGS. 5A to 5L are an enlarged plan view respectively illustrating a tip of the holding pin according to other embodiments.
Figure 5B:
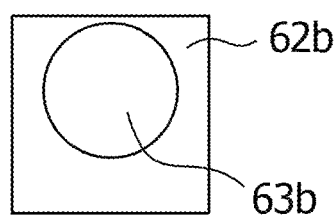
Figure 5C:
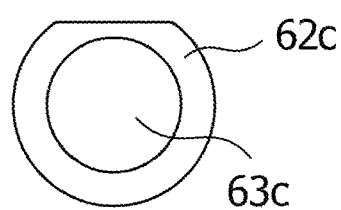
Figure 5D:
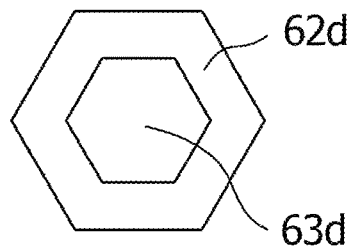
Figure 5E:
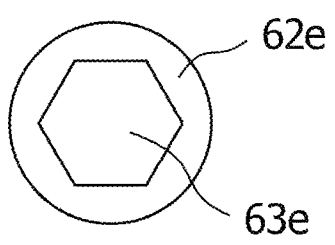
Figure 5F:
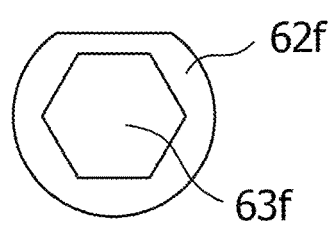
Figure 5G:
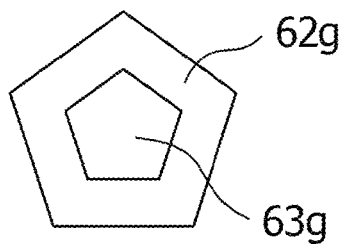
Figure 5H:
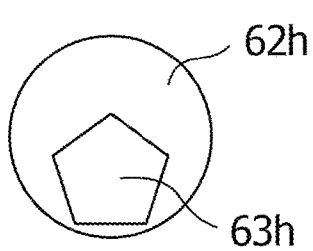
Figure 5I:
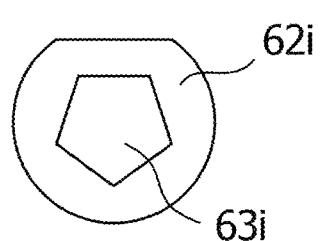
Figure 5J:
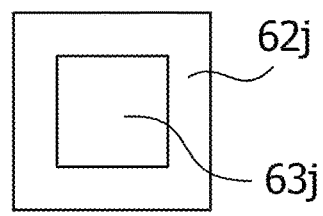
Figure 5K:
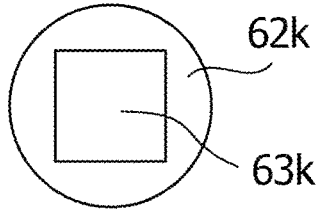
Figure 5L:
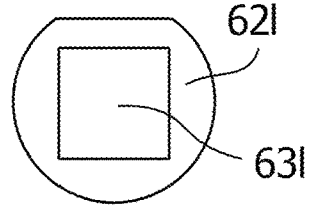

Referring to FIG. 4, the holding pin is configured so that the outer edges of the contact portion 63 and the indentation portion 62 are concentric to each other. However, the present invention is not limited to this. More specifically, it is preferable that the holding pin be shaped so that it is capable of preventing poor filling of the resin and so that it can naturally agree with the arrangement of the dimples and can be naturally held inside its bank portion. It is particularly preferable that the holding pin be shaped so that the projecting portion including the skin layers generated in the indentation portion 62 after the injection molding can be easily removed. For example, the holding pin can be configured to have the respective configurations of the contact portion 63 and the indentation portion 62 illustrated in FIGS. 5A to 5L. FIG. 5A illustrates a configuration in which a contact portion 63a and an indentation portion 62a are formed as circles eccentric to each other. FIG. 5B illustrates a configuration in which the outer edge of an indentation portion 62b has a rectangular shape. FIG. 5C illustrates a case in which the outer edge of an indentation portion 62c has a shape of a circle with a cutout. FIG. 5D illustrates a case in which both the outer edges of a contact portion 63d and an indentation portion 62d have a hexagonal shape. FIG. 5E illustrates a case in which the outer edge of a contact portion 63e is hexagonal and that of an indentation portion 62e is circular. FIG. 5F illustrates a case in which the outer edge of a contact portion 63f is hexagonal and that of an indentation portion 62f has a shape of a circle with a cutout. FIG. 5G illustrates a case in which both the outer edges of a contact portion 63g and an indentation portion 62g have a pentagonal shape. FIG. 5H illustrates a case in which the outer edge of a contact portion 63h is pentagonal and that of an indentation portion 62h is circular. FIG. 5I illustrates a case in which the outer edge of a contact portion 63i is pentagonal and that of an indentation portion 62i has a shape of a circle with a cutout. FIG. 5J illustrates a case in which both the outer edges of a contact portion 63j and an indentation portion 62j have a rectangular shape. FIG. 5K illustrates a case in which the outer edge of a contact portion 63k is rectangular and that of an indentation portion 62k is circular. FIG. 5L illustrates a case in which the outer edge of a contact portion 63l is rectangular and that of an indentation portion 62l has a shape of a circle with a cutout.

The case of molding the outer layer of a golf ball is described above. However, the present invention can also be applied to a case of molding an inner layer of a golf ball having a multilayered structure. By applying the present invention to such a case, the skin layers generated on the surface of the inner layer can be reduced or removed. Accordingly, the durability of a golf ball can be improved if an outer layer is formed on the outside of the inner layer. As a matter of course, the projecting portion can be formed on both the inner layer and the outer layer of a golf ball having a multilayered structure. In this case also, the projecting portion can be formed in the entire area of the tip end face of the holding pin or can be formed in the area of about 1.0% or more in relation to the entire area.

With respect to the composition of the material of the outer layer, various types of materials used for the outer layer of a golf ball can be employed. Similarly, in the case of forming an inner layer or a single layer of a golf ball, with respect to the composition of the material for the inner layer or the single layer, various types of materials used for the inner layer or the single layer of a golf ball can be employed. The material of any of an outer layer, an inner layer, or a single layer preferably has a melt viscosity of about 1.0 Pa·s or higher, more preferably about 5.0 Pa·s or higher at 230° C. measured by a Capirograph. If the melt viscosity is lower than about 1.0 Pa·s, the material may be liquefied, which may cause poor molding. Either a thermoplastic resin or a thermosetting resin can be used for the materials of an outer layer, an inner layer, and a single layer. A thermoplastic resin is preferably used. Furthermore, for these materials, it is yet more preferable to use nonionic or ionic copolymers, thermoplastic elastomers, thermoplastic polyurethanes, or blends thereof. These materials can further contain necessary additives.

EXAMPLES

As described in Table 1, the holding pin was controlled so that in molding an outer layer (cover) or an inner layer (intermediate layer) of a golf ball having a two-piece (2P) or a three-piece (3P) structure, a projecting portion with a predetermined height and area is formed on the surface of the outer layer or the inner layer. In Table 1, an item "area ratio of projecting portion" represents the ratio of the area of the projecting portion in relation to the area of the tip end of the holding pin. In the examples in which the area ratio of the projecting portion was 100%, a holding pin having a flat tip with no indentation portion was used and the retraction of the holding pin was controlled so that the height thereof became a predetermined height. In the example in which the area ratio of the projecting portion was less than 100%, a holding pin with an indentation portion of which the area of the tip of the pin was decreased was used so that the projecting portion with the area less than 100% was formed. The formed projecting portions were removed by polishing. With respect to the golf balls thus obtained, the durability with respect to cracking was tested.

The durability with respect to cracking was evaluated by ADC Ball COR Durability Tester, which is a product of Automated Design Corporation. After shooting the golf ball by air pressure, the ball was allowed to serially collide with two metal plates placed in parallel to each other, and the number of times of shooting required until the ball cracked was measured.

For the material of the two-piece structured golf balls, a blend prepared by mixing 50 wt. % of Himilan 1601 and 50 wt. % of Himilan 1706 (both are an ionomer resin product of DuPont-Mitsui Polychemicals Co., Ltd.) was used. For the material of the inner layer of the three-piece structured golf balls, HPF 1000 (an ionomer resin product of DuPont®) was used. For the material of the outer layer of the three-piece structured golf balls, a blend prepared by mixing 50 wt. % of Himilan 1601 and 50 wt. % of Himilan 1706 was used similarly to the case of the two-piece structured golf balls.

TABLE 1

|  | Example | | | | | | Comparative Example | | | |
| --- | --- | --- | --- | --- | --- | --- | --- | --- | --- | --- |
|  | 1 | 2 | 3 | 4 | 5 | 6 | 1 | 2 | 3 | 4 |
| Structure of ball | 2P | 2P | 2P | 3P | 3P | 3P | 2P | 2P | 3P | 3P |
| Location of forming projecting portion | Outer layer | Outer layer | Outer layer | Inner layer | Inner and outer layers | Outer layer | — | Outer layer | — | Outer layer |
| Height of projecting portion (mm) | 0.3 | 0.5 | 1.0 | 0.5 | 1.0 | 0.5 | 0 | 0.1 | 0 | 0.1 |

TABLE 1-continued

|  | Example | | | | | | Comparative Example | | | |
| --- | --- | --- | --- | --- | --- | --- | --- | --- | --- | --- |
|  | 1 | 2 | 3 | 4 | 5 | 6 | 1 | 2 | 3 | 4 |
| Area ratio of projecting portion (%) | 100 | 100 | 100 | 100 | 0.3 | 100 | 100 | 100 | 100 | 100 |
| Durability to cracking (times) | 132 | 163 | 150 | 221 | 155 | 131 | 88 | 94 | 99 | 106 |

As shown in Table 1, firstly, in the Comparative Example 1 in which no projecting portion was formed in a two-piece structured golf ball, the durability with respect to cracking of the golf ball was 88 times. On the other hand, in the Examples 1 to 3, in which a projecting portion having the height of 0.3 to 1.0 mm was formed in the same area as that of the tip of the holding pin, the durability with respect to cracking was more than 130 times for either of the corresponding golf balls. As a result, an excellent durability with respect to cracking was observed. In the Comparative Example 2 in which a projecting portion with a height of 0.1 mm was formed, the durability with respect to cracking of the golf ball was 94 times. As a result, it was not possible to greatly improve the durability with respect to cracking.

Next, in the Comparative Example 3 in which no projecting portion was formed in the three-piece structured golf ball, the durability with respect to cracking of the golf ball was 99 times. On the other hand, in the Examples 4 and 6 in which a projecting portion having the height of 0.5 mm was respectively formed on the inner or the outer layer of a three-piece structured golf ball, the durability with respect to cracking of both golf balls was more than 130 times. As a result, an excellent durability with respect to cracking was observed. In particular, in the Example 4 in which the projecting portion was formed on the inner layer, the durability with respect to cracking of more than 200 times was observed. As a result, a quantum leap in the durability with respect to cracking was observed. In the Example 5, in which a projecting portion having the height of 1 mm was formed in the area of 0.3% in relation to the area of the projecting portion formed in the Examples 4 and 6 was formed on both the inner and the outer layers, the durability with respect to cracking was more than 150 times. As a result, an excellent durability with respect to cracking was observed. On the other hand, in the Comparative Example 4, in which a projecting portion with the height of 0.1 mm was formed on the outer layer, the durability with respect to cracking was 106 times. As a result, it was almost not possible to improve the durability with respect to cracking.

What is claimed is:

1. A mold for a golf ball comprising:
at least two mold bodies, in which a cavity for molding the golf ball is formed by joining the bodies together; and
a movable holding pin disposed in at least one of the mold bodies, a tip of the holding pin comprising an indentation portion which is located continuously along a whole circumference of the holding pin, the indentation portion being arranged in an area of at least 0.2% in relation to an entire area of an imaginary top surface of the tip of the holding pin on which the indentation portion is assumed to be absent and having a depth of at least 0.2 mm.

2. The mold according to claim 1, wherein the tip of the holding pin further comprises a contact portion for directly contacting a core member of the golf ball, the contact portion being located in a center portion thereof.

3. The mold according to claim 2, wherein the indentation portion is located around the contact portion.

4. The mold according to claim 1, wherein the indentation portion is arranged in an area of at least 1.0% in relation to the entire area of the imaginary top surface of the tip of the holding pin and has a depth of at least 0.3 mm.

5. The mold according to claim 1, wherein the number of the holding pins is in a range of 2 to 20 for the whole mold.

\* \* \* \* \*